Patented Mar. 22, 1927.

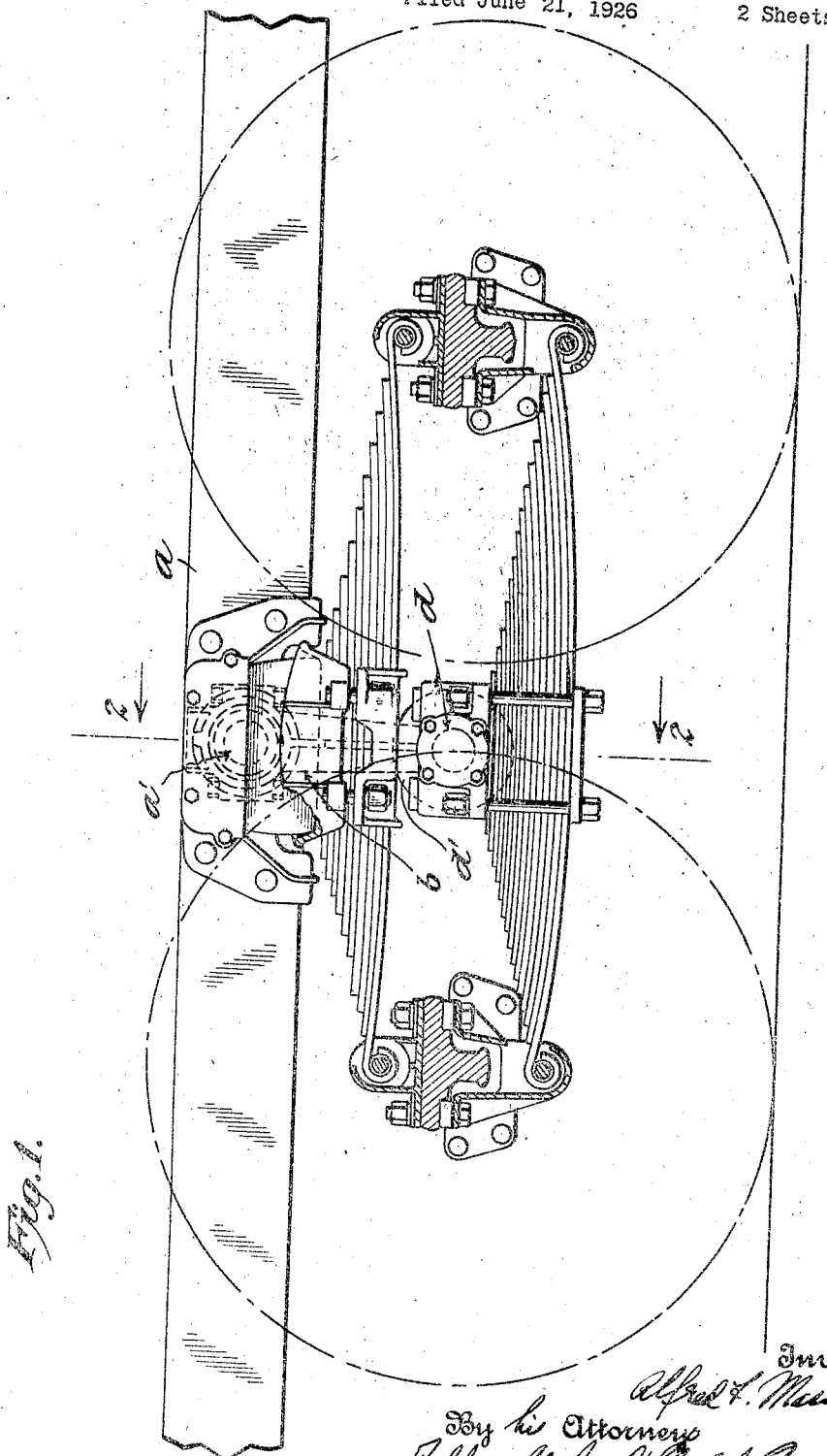

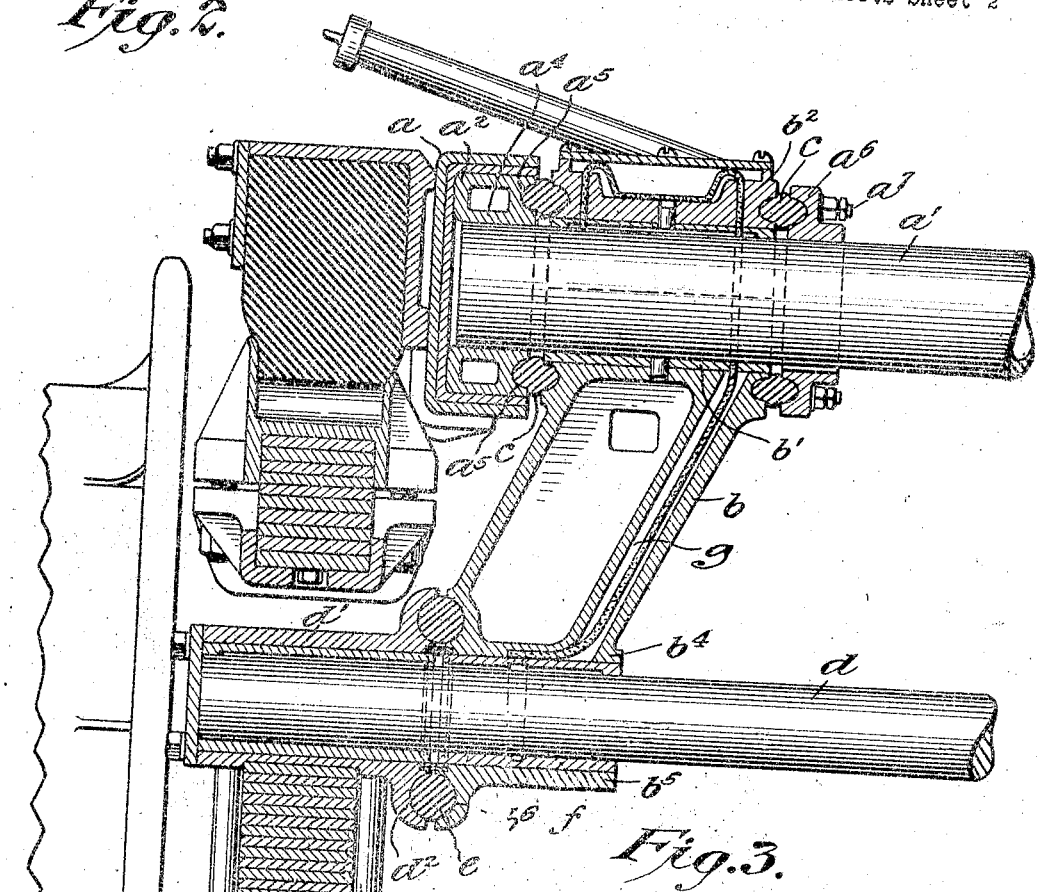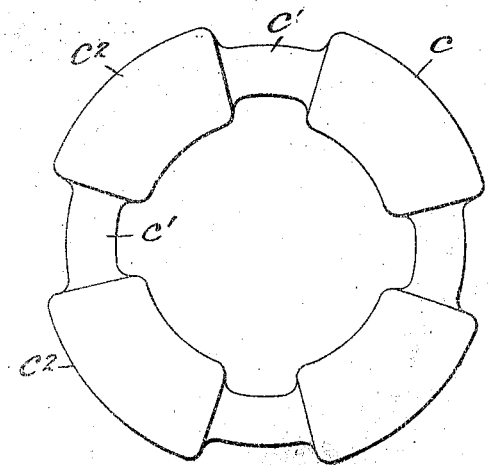

1,621,677

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

SPRING SUSPENSION.

Application filed June 21, 1926. Serial No. 117,200.

In vehicles, where a dual rear axle construction is employed, it is desirable to mount the truck pivotally about a pivoting axle which in turn is spaced by suitable means from a second pivoting axle mounted on the frame. This construction is described in the co-pending application of Josiah E. Reid, Serial No. 130,130, filed August 19, 1926.

In the above structure it becomes desirable to cushion the thrust of the axles transversely of the frame and the present invention seeks to provide a suitable means for so doing, the object being attained in the manner described hereinafter.

Reference will now be had to the accompanying drawings for a more detailed description of the invention, wherein:

Figure 1 is a side elevation of the spring suspension upon which invention is applied.

Figure 2 is a section on line 2—2 of Figure 1 and looking in the direction of the arrows.

Figure 3 is a detailed view of the cushioning element.

In the drawings, $a$ represents the channel member of the frame of a vehicle to which is secured a pivoting axle $a'$ through a suitable connecting means $a^2$. The latter may be in the form of a bracket riveted to the channel and provided with an annular flange $a^3$ in which the axle rests. The outer face of this flange is provided with a seat $a^5$, of a form to receive a cushioning member to be later described. On the axle and spaced from the flange is a collar $a^6$ having a seat similar to $a^5$ and facing the latter.

Between the opposed seats is disposed a bracket $b$ having a bearing $b'$ and a co-operating bearing plate $b^2$ securing the shaft therein. The outer faces of these co-operating bearing members are formed as seats to co-operate with those on the collar and flange and between the opposed faces on the respective members, yielding, non-metallic elements $c$ such as rubber, are positioned. These cushioning elements are annular in character and formed with restricted portions $c'$ and normal portions $c^2$, the section of the bearing portions being generally elliptical or that of an oblate spheroid. Through bolts $a^7$ engage the flange and collar and maintain the cushioning elements in their respective seats under compression. By forming these elements as described, and providing the co-operating seats, rotation of the bracket about the axle is yieldingly resisted.

At the lower end of the bracket $b$, a second bearing portion $b^4$ is provided with a co-operating member $b^5$ which may be bolted to $b^4$ in a manner similar to the upper bearing. The outer face of this bearing portion is provided with a seat $b^6$ to receive a cushioning element to be later described. Upon a second pivoting axle $d$ is secured a sleeve $d'$ provided with means for securing the spring thereto. On the inner end of this sleeve is formed a seat $d^2$ opposing the seat $b^6$, and formed similar thereto.

Between the seats $d^2$ and $b^6$ is disposed an annular cushioning element $e$ having restricted portions and normal portions, the cross section of the latter being generally that of an oblate spheroid similar to those of cushioning element $c$. This formation enables a partial rotation to take place between the bracket and the pivoting axle $d$.

Bushings $f$ may be provided in the bearings and oil ducts $g$ may be formed in the bracket to lubricate the lower bearing from the well on the upper bearing. These features, however, form no part of the present invention.

From the above it will be seen that the side thrust of the vehicle to the right or left is cushioned by the above construction and that the frame is relieved from the most severe strains accompanying such thrust.

The specific embodiment of the invention is not to be limited by the above description, since it is obvious that modifications may be made therein to satisfy particular needs, but the invention is to be defined only by the appended claims.

What I claim is:

1. In a vehicle construction, a plurality of pivoting axles, means to support one from another, and means to cushion the side thrust of one upon the other through the supporting means.

2. In a vehicle construction, a plurality of pivoting axles, means to pivotally support one from another, and means to cushion the side thrust of one upon the other through the supporting means.

3. In a vehicle construction, a plurality of pivoting axles, means to pivotally support one from another with capability of relative axial movement, and means to cushion the side thrust of one upon the other through the supporting means.

4. In a vehicle construction, a pivoting axle carried by the vehicle frame, a second pivoting axle, a bracket connecting the two, bearings in the bracket to engage the axles, means on the first named axle to confine a bracket bearing to a definite axial relationship with respect to the axle, cushioning means between the bearing and last named means to cushion relative axial movements and cushion means on the lower axle to cushion relative axial movement of the bracket and axle.

5. In a vehicle construction, a pivoting axle carried by the vehicle frame, a second pivoting axle, a bracket connecting the two, bearings in the bracket to engage the axles, and cushioning means between the bearings and axles to permit partial rotation of one with respect to the other and to cushion the axial thrust beween the two axles.

6. In a vehicle construction, a pivoting axle carried by the vehicle frame, a second pivoting axle, a bracket connecting the two, bearings in the bracket to engage the axles, seats carried with the bearings, opposed seats carried with the first axle, annular yielding non-metallic cushioning elements disposed between the seats, a seat carried by the second axle, and an annular yielding non-metallic cushioning element carried between said seats.

7. In a vehicle construction, a pivoting axle carried by the vehicle frame, a second pivoting axle, a bracket connecting the two, bearings in the bracket to engage the axles, seats carried with the bearings, opposed seats carried with the axles, annular yielding non-metallic cushioning elements disposed between the seats comprising constricted portions and normal portions, and means to confine the latter between the seats, whereby side thrust and rotation are yieldingly resisted.

8. In a vehicle construction, a pivoting axle carried by the vehicle frame, a second pivoting axle, a bracket connecting the two, bearings in the bracket to engage the axles, seats carried with the bearings, opposed seats carried with the axles, annular yielding non-metallic cushioning elements disposed between the seats comprising constricted portions and normal portions, the annuli between the upper bearing and axle having an oblate spheroidal cross section, and means to confine the annuli between the seats, whereby side thrust and rotation are yieldingly resisted.

This specification signed this 17th day of June A. D. 1926.

ALFRED F. MASURY.